No. 861,308. PATENTED JULY 30, 1907.
J. W. McMANN.
SCOOP TRUCK.
APPLICATION FILED JULY 7, 1906.

WITNESSES
INVENTOR
JOHN W. McMANN
BY Whittemore Hulbert & Whittemore
ATTY

UNITED STATES PATENT OFFICE.

JOHN W. McMANN, OF RICHMOND, MICHIGAN, ASSIGNOR OF ONE-HALF TO JAMES T. EAMAN, OF DETROIT, MICHIGAN.

SCOOP-TRUCK.

No. 861,308.  Specification of Letters Patent.  Patented July 30, 1907.

Application filed July 7, 1906. Serial No. 325,076.

*To all whom it may concern:*

Be it known that I, JOHN W. MCMANN, a citizen of the United States of America, residing at Richmond, in the county of Macomb and State of Michigan, have invented certain new and useful Improvements in Scoop-Trucks, of which the following is a specification, reference being had therein to the accompanying drawings.

The invention relates to improvements in trucks especially designed for use in carrying coal, and for other analogous uses.

It is the object of the invention to obtain a construction which is adapted to be quickly filled and emptied merely by the manipulation of the truck, without the use of a shovel.

The invention consists in the construction as hereinafter set forth.

Figure 1:
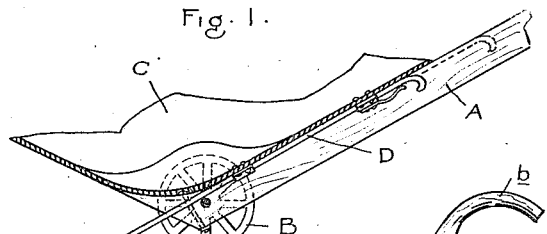
Figure 3:
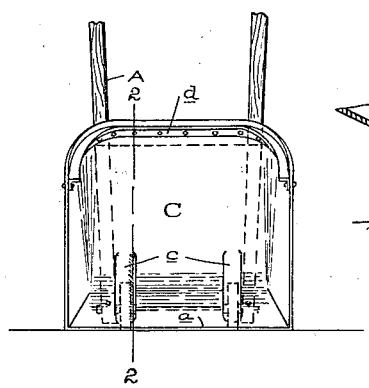
Figure 2:
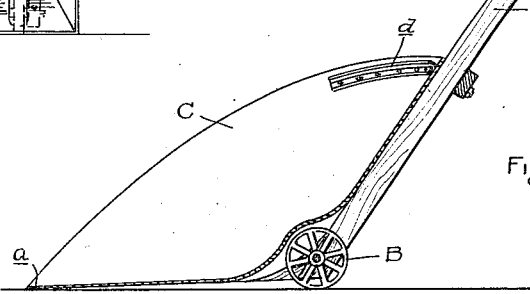
Figure 4:
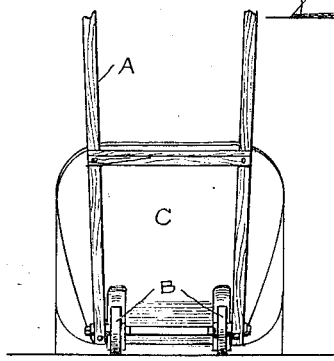
Figure 5:
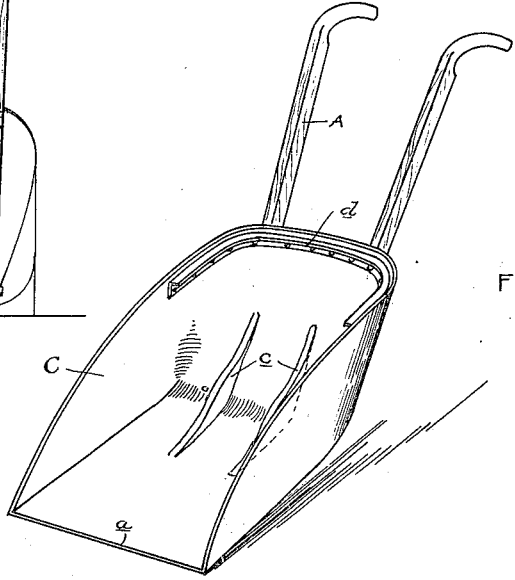

In the drawings, Figure 1 is a longitudinal section of the truck, with the supporting bolt in position. Fig. 2 is a longitudinal section through the truck without the supporting bolt, taken on lines 2—2, of Fig. 3. Fig. 3 is a front elevation of Fig. 2. Fig. 4 is a rear elevation, and Fig. 5 is a perspective view.

A is a handled frame which at its lower end is mounted upon truck wheels B.

C is a scoop secured upon the frame A so that in one position of said frame A the outer end a of the scoop rests upon the floor or pavement. In this position the frame A is inclined rearward, but the handles b thereof are elevated above the position for propelling the truck.

To provide clearance for the wheels B the scoop C is preferably provided with portions c which are bent inward as shown.

d is a reinforcing rib at the upper end of the scoop, which as shown, is formed of angle iron.

With the construction described in operation the truck is placed in a position shown in Fig. 2, adjacent to the pile of material to be carried, and is then shoved forward so as to insert the forward end or nose of the scoop beneath the pile. The handles of the truck are then drawn downward which shifts the material within the scoop to distribute it uniformly therein until the center of gravity is substantially in the plane of the axle of the wheels. The truck may then be readily moved to the point of discharge, and the material dumped by again throwing up the handles.

If desired provision may be made for holding the loaded truck in position for carrying by means of a sliding rod or bolt D, connected with the scoop C. This bolt when moved into the position shown in Fig. 1, will support the truck, the center of gravity being between the axles of the wheels and the point of bearing of the rod D upon the ground.

What I claim as my invention is,—

1. The combination of a scoop, wheels supporting the same centrally, a handle for tilting said scoop from a position in which the nose thereof is in contact with the ground or pavement, to a position of substantial balance, and an adjustable rod arranged to be projected forward of said wheels to support said nose free from the ground.

2. The combination of a flaring scoop, a wheel supporting the same centrally, a handle for tilting said scoop for the purpose described, and an adjustable rod in the plane of said handle, for the purpose described.

3. The combination of a scoop, wheels supporting the same centrally, a handle for tilting the scoop, and means forward of the wheels for supporting the nose of said scoop free from the ground.

4. The combination of a scoop comprising a back, a bottom and sides connected thereto and wheels supporting said scoop at the junction of the back and bottom, integral portions of said back and bottom extending inwardly to clear said wheels and forming housings therefor, substantially as described.

In testimony whereof I affix my signature in presence of two witnesses.

JOHN W. MCMANN.

Witnesses:
HERBERT C. BATTY,
CHARLES H. HEATH.